US012108150B2

(12) United States Patent
Garcia et al.

(10) Patent No.: US 12,108,150 B2
(45) Date of Patent: Oct. 1, 2024

(54) SYSTEM AND METHOD FOR EXTRACTING INFORMATION ON THE SPATIAL DISTRIBUTION OF WAVEFRONTS

(71) Applicant: Wooptix S.L., Madrid (ES)

(72) Inventors: Ricardo Oliva Garcia, Madrid (ES); Ceruso Sabato, Madrid (IT); Jose Manuel Rodriguez Ramos, Madrid (ES)

(73) Assignee: WOOPTIX S.L., Madrid (ES)

( * ) Notice: Subject to any disclaimer, the term of this patent is extended or adjusted under 35 U.S.C. 154(b) by 48 days.

(21) Appl. No.: 17/816,687

(22) Filed: Aug. 1, 2022

(65) Prior Publication Data

US 2024/0040246 A1 Feb. 1, 2024

(30) Foreign Application Priority Data

Aug. 11, 2021 (EP) .................................. 21382755.3

(51) Int. Cl.
*H04N 23/67* (2023.01)
*G01J 9/00* (2006.01)
(Continued)

(52) U.S. Cl.
CPC ............... *H04N 23/675* (2023.01); *G01J 9/00* (2013.01); *G02B 3/14* (2013.01); *G02B 5/04* (2013.01); *G06T 7/50* (2017.01)

(58) Field of Classification Search
CPC ........... H04N 23/675; G06T 7/50; G01J 9/00; G02B 3/14; G02B 5/04
See application file for complete search history.

(56) References Cited

U.S. PATENT DOCUMENTS

| 11,747,446 B1* | 9/2023 | Uthoff ..................... G02F 1/292 |
| | | 359/315 |
| 2006/0126019 A1* | 6/2006 | Liang ................. G01M 11/0257 |
| | | 351/246 |

(Continued)

FOREIGN PATENT DOCUMENTS

| EP | 3358321 A1 | 8/2018 |
| JP | 2018137648 A | 8/2018 |

(Continued)

OTHER PUBLICATIONS

Taiwan Patent Office, Office Action Issued in Application No. 111128642, Jun. 12, 2023, 15 pages. (Submitted with Partial Translation).

(Continued)

*Primary Examiner* — Mohamed A. Wasel
(74) *Attorney, Agent, or Firm* — McCoy Russell LLP

(57) ABSTRACT

An optical system for capturing information on the two-dimensional and/or three-dimensional distribution of wavefronts from a plurality of images, wherein the optical system comprises at least one sensor for capturing images, wherein the at least one sensor comprises a plurality of pixels and wherein at least some of the pixels comprise at least two photodiodes; at least one tunable optical element, wherein said at least one tunable optical element is adapted to vary the focus of the optical system; and wherein the optical system is configured for capturing a plurality of images with the at least one sensor at a plurality of focus positions set by the at least one tunable optical element.

12 Claims, 6 Drawing Sheets

(51) Int. Cl.
   *G02B 3/14* (2006.01)
   *G02B 5/04* (2006.01)
   *G06T 7/50* (2017.01)

(56) References Cited

U.S. PATENT DOCUMENTS

| | | | |
|---|---|---|---|
| 2012/0200671 A1* | 8/2012 | Silveira | G02B 5/32 |
| | | | 348/46 |
| 2016/0088213 A1* | 3/2016 | Miyai | H04N 23/56 |
| | | | 348/349 |
| 2018/0241949 A1 | 8/2018 | Kawai | |
| 2018/0324359 A1 | 11/2018 | Pan et al. | |
| 2019/0094424 A1 | 3/2019 | Fernandez-Dorado et al. | |
| 2020/0143543 A1 | 5/2020 | Oh et al. | |
| 2021/0211580 A1* | 7/2021 | Galor Gluskin | G02B 7/34 |

FOREIGN PATENT DOCUMENTS

| | | | |
|---|---|---|---|
| JP | 2020506390 A | 2/2020 | |
| TW | 201728959 A | 8/2017 | |
| WO | 2018141853 A1 | 8/2018 | |
| WO | 2020066341 A1 | 4/2020 | |

OTHER PUBLICATIONS

Gerchberg, R. et al., "A Practical Algorithm for the Determination of Phase from Image and Diffraction Plane Pictures," Optik, vol. 35, No. 2, 1972, 10 pages.

Fineup, J., Phase retrieval algorithms: a comparison, Applied Optics, vol. 21, No. 15, Aug. 1, 1982, 12 pages.

Suwajanakorn, S. et al., "Depth from Focus with Your Mobile Phone," Proceedings of the 2015 IEEE Conference on Computer Vision and Pattern Recognition (CVPR), Jun. 7, 2015, Boston, MA, 10 pages.

Moeller, M. et al., "Variational Depth From Focus Reconstruction," IEEE Transactions on Image Processing, vol. 24, No. 12, Dec. 2015, 10 pages.

Hu, J. et al., "Improved Wavefront Reconstruction and Correction Strategy for Adaptive Optics System With a Plenoptic Sensor," IEEE Photonics Journal, vol. 13, No. 4, Aug. 2021, 8 pages.

European Patent Office, Extended European Search Report Issued in Application No. 21382755.3, Feb. 22, 2022, Germany, 8 pages.

Sabato, C. et al., "Method for Depth Estimation for a Variable Focus Camera," European Application No. EP21382458.4, Reference Application No. EP133930-PM251jou, Applicant: Wooptix S.L., Receipt Date May 20, 2021, 60 pages.

Canadian Intellectual Property Office, Examination Report Issued in Application No. 3,166,441, Sep. 21, 2023, 5 pages.

Japanese Patent Office, Office Action Issued in Application No. 2022-126669, Oct. 3, 2023, 6 pages.

* cited by examiner

SYSTEM AND METHOD FOR EXTRACTING INFORMATION ON THE SPATIAL DISTRIBUTION OF WAVEFRONTS

CROSS-REFERENCE TO RELATED APPLICATION

The present application claims priority to European Patent Application No. 21382755.3 filed on Aug. 11, 2021. The entire contents of the above-listed application are hereby incorporated by reference for all purposes.

TECHNICAL FIELD

The disclosure relates to an optical system, a method, a system and a storage media.

BACKGROUND

When capturing two-dimensional images from three-dimensional scenes or objects, e.g. capturing an image from a scene in real physical three-dimensional space and/or capturing an image from a three-dimensional object in real physical three-dimensional space, depth information is lost when the three-dimensional scene or object is projected onto a two-dimensional image.

SUMMARY

It is an important and challenging task in computer vision or robotic vision and industrial metrology to recover at least part of this lost spatial depth information in order to, for example, be able to recognize and characterize three-dimensional objects and three-dimensional surface features, e.g. characterizing surfaces of semiconductors in wafer metrology and/or to distinguish between background and foreground features or objects in captured two-dimensional images.

Furthermore, when an electromagnetic wave passes through an inhomogeneous medium, its wavefront phase is distorted or deformed with respect to its original shape or phase. Said wavefront distortions or aberrations can affect and degrade the performance of optical systems.

Existing techniques require the use of costly intricate optical system hardware and computer resource intensive processing in order to capture, extract and process information on the two-dimensional and/or three-dimensional distribution and shape of wavefronts carrying information on objects/subjects in real physical three-dimensional space.

Moreover, the depth resolution of current techniques is not satisfying in view of the increasing depth resolution demands of modern industrial metrology applications, e.g. wafer metrology, or of medical applications, in particular, medical imaging, e.g. ophthalmic examinations of the eye tomography in tissues or microscopy.

Furthermore, current techniques for extracting and processing information on the two-dimensional and/or three-dimensional distribution and shape of wavefronts carrying information on objects/subjects in real physical three-dimensional space are too slow for accurate real-time sampling of the temporal evolution of wavefront shape changes/wavefront phase changes and reconstruction of original wavefront shapes/original wavefront phases.

Problem

It is therefore an objective of the present disclosure to provide improved means for extracting/estimating/recovering depth information from two-dimensional images captured by an optical system/a camera/image-capturing device/image-acquisition system from a real three-dimensional scene or object or subject.

In particular, for example, it is an aim of the present disclosure to speed up the capturing and processing of information on the two-dimensional and/or three-dimensional distribution and shape of wavefronts carrying information on objects/subjects in real physical three-dimensional space and to improve the accuracy and resolution of the captured, extracted and estimated depth information.

Solution

According to the present disclosure, said objectives are achieved by an optical system, a computer-implemented/computer-implementable method, a system and a computer-storage media.

For example, an optical system/acquisition system/camera system for capturing information on the two-dimensional and/or three-dimensional distribution of wavefronts from a plurality of images may comprise one, some or all of the following components and configurations:
- at least one sensor, e.g. a charge-coupled device (CCD), for capturing images, wherein the at least one sensor may comprise a plurality of pixels and wherein at least some of the pixels may comprise at least two photodiodes,
- at least one tunable optical element, wherein said at least one tunable optical element is adapted to vary the focus of the optical system,
  wherein the optical system can be configured for capturing a plurality of images with the at least one sensor at a plurality of focus positions, e.g. a plurality of different focus positions, set by the at least one tunable optical element.

As indicated above, herein an/the optical system may also be referred to as acquisition system or camera system.

Herein, the term plurality of different focus positions may also comprise pluralities of focus positions, wherein not all focus positions are unique, but also may comprise pluralities of focus positions, wherein some focus positions are the same, but that may refer to focus positions at different points in time.

Herein, the term information on the two-dimensional and/or three-dimensional distribution of wavefronts may comprise information on the two-dimensional and/or three-dimensional shape or phase of a wavefront in a particular optical plane and/or at a particular time and distance from the at least one sensor.

In particular, the term information on the three-dimensional distribution of wavefronts may refer to a tomography of the three-dimensional distribution, i.e. the volumetric distribution, of the wavefronts of electromagnetic fields, e.g. the three-dimensional distribution of wavefronts along the optical axis of an/the optical system, e.g. over a stack of images, i.e. over a/the plurality of images captured by the at least one sensor at a plurality of focus positions/plurality of different focus positions set by the at least one tunable optical element.

In other words, the means presented herein can allow, for example, to derive/determine/measure the three-dimensional distribution of wavefronts along the optical axis of an/the optical system from a stack or series of captured images at a plurality of focus positions/at a plurality of different focus positions.

Furthermore, the step of capturing images with the at least one sensor and/or the step of capturing information on the two-dimensional and/or three-dimensional distribution of wavefronts by the at least one sensor may refer to capturing light intensities, in particular to capturing a/the two-dimensional light intensity distribution of a wavefront/of wavefronts captured in the plane of the at least one sensor.

Herein the at least two photodiodes per pixel of a/the sensor may be understood as being arranged in the same plane, i.e. the sensor plane. Furthermore, the multiple photodiodes per pixel may be arranged horizontally or vertically. For exemplary sensor formats of 16:9 or 4:3 and/or when capturing landscapes or objects are distributed horizontally, the multiple photodiodes may be arranged per pixel in a horizontal orientation to ensure an optimal capture of information.

Herein, the term plurality of images may refer to a plurality of images captured by the at least one sensor from a scene or an object or a subject in real physical three-dimensional space and wherein the images are captured at a plurality of focus positions/at a plurality of different focus positions.

The scene or object or subject in real physical three-dimensional space can be static or dynamic.

For example, if a/the scene or object or subject in real physical three-dimensional space is dynamic, i.e. it is possible that a movement within a/the scene and/or a movement of an/the object or a/the subject and/or a movement of the at least one sensor may occur in between different captured images.

The tunable optical element may further be configured such that it can vary the focus of the optical system on timescales that can correspond to or that can be shorter than the time scales of possible dynamics in the images to be captured, e.g. movements occurring within the scene such as movements of objects or subjects.

The information on the two-dimensional and/or three-dimensional distribution of wavefronts for a/the plurality of images that can be captured by the at least one sensor at a plurality of focus positions/at different focus positions can be used to extract depth information, e.g. depth maps, of a scene or object or subject in real three-dimensional space that has/have been captured in the plurality of images.

In other words, the above and herein exemplary described optical system and means for capturing information on the two-dimensional and/or three-dimensional distribution of wavefronts from a plurality of images may also be understood as optical system/means for capturing/extracting depth information from a plurality of images.

The above-mentioned exemplary at least one tunable optical element may, for example, be configured to vary the focus of the optical system according to a focus schedule, wherein said exemplary focus schedule can specify a predefined list of focus positions to be set by the at least one tunable optical element and also can specify how this list is to be traversed when capturing a sequence or plurality of images of a scene/object/subject by the at least one sensor of an exemplary optical system.

Said exemplary predetermined focus schedule may comprise a plurality of focus positions that can comprise different focus positions and/or identical focus positions.

Stated differently, a/the focus schedule may specify that the same focus position may be used at different points in time for capturing an image.

A/the optical system may then be configured for traversing said exemplary focus schedule chronological to capture images at defined focus positions set by the at least one tunable optical element with the at least one sensor. This way an exemplary focal stack can be generated that can comprise a plurality of images at different focus positions and/or a plurality of images having the same focus position.

Stated differently, an exemplary focal stack may comprise a set of images at different focus positions and sets, i.e. one or more sets, of images with the same focus position(s).

The above and herein exemplary described means and optical system provide an improvement over current systems with respect to the resolution and speed with which spatial information, e.g. depth maps, on scenes/objects/subjects in real three-dimensional space can be captured and extracted.

In particular, the synergy of using a tunable optical element for varying the focus of the optical system in combination with the at least one sensor comprising a plurality of pixels and wherein at least some of the pixels, e.g. all of the pixels, comprise at least two photodiodes, yields unexpected and unprecedented improvements regarding the resolution and accuracy with which depth maps of scenes/objects/subjects in real three-dimensional space can be obtained from a plurality of images with different focus positions.

This is because the combination of the information extracted by the at least one sensor comprising a plurality of pixels, wherein at least some of the pixels comprise at least two photodiodes and the information from the plurality of focus positions of the captured images, wherein the focus positions have been set by the at least one tunable optical element, allows to break the degeneracy or ambiguity along the optical axis, e.g. the z-axis, of an/the optical system within the depth of field for a given focus position/focus plane to determine the value of the focus position/focus point along the optical axis more precisely.

In particular, and as will be explained further below, the different viewpoints per pixel that can be provided by the multiple photodiodes of a pixel can allow a trigonometric determination of the focus position(s)/focus point(s) along the optical axis of an/the optical system and along the focal stack of the plurality of images captured at different focus positions set by the at least one tunable optical element.

Hence, the information extracted/extractable from the plurality of images captured at different focus positions set by the at least one tunable optical element and the information extracted/extractable from the multiple photodiodes per pixel of at least one sensor can significantly improve the depth resolution of depth maps that can be obtained by the herein described optical system as compared to current systems.

The exemplary at least one tunable optical element of the above and herein described optical system may comprise a liquid lens and/or a movable lens, e.g. lens movable by actuators, and/or a tunable prism or any combination of said optical element types.

Furthermore, the at least one tunable optical element can be configured to change the focus of the optical system on time scales of less than 10 ms.

This can, for example, enable carrying out real-time capture and extraction of depth information and wavefront phase information from the captured plurality of images such that a processing of the plurality of images captured at a plurality of focus positions/at a plurality of different focus positions set by at least one tunable optical element of the optical system can occur parallel or interleaved or embedded with for example capturing a video stream having, for example, an output image frame rate of 30 frames a second (fps) or higher.

For example, with the in real-time captured and extracted depth information and wavefront phase information, an all-in-focus video-stream and/or an all-in-focus image of a scene or object or subject can be generated.

Furthermore, with the extracted depth information and wavefront phase information, the wavefront phase/wavefront shape can be reconstructed at different optical planes that do not need to coincide with the focal planes set by the least one tunable optical element, i.e. a tomography of the three-dimensional wavefront phase/wavefront shape distribution can be performed.

This, for example, can allow constructing/generating a view of an imaged/captured object/subject/scene from different points of view, while maintaining the full two-dimensional resolution of the image.

Furthermore, the extracted depth information and wavefront phase information can allow measuring dimensions and shapes of objects, in particular the surface shapes of objects.

Further examples for using the extracted depth information and wavefront phase information can include generating/computing images at arbitrary focus or arbitrary distance and/or creating stereographic/three-dimensional images.

The above and herein exemplary described optical system may in addition comprise a further optical element, e.g. a lens, which can be configured to change the focal length range of the optical system.

Said exemplary possible further optical element may be arranged before or after the at least one tunable optical element along an/the optical axis of the optical system.

For example, for smartphone applications, said exemplary further optical element may be configured to provide a focal length range from a few centimeters to infinity, whereas for applications in industrial metrology and/or medical imaging said exemplary further optical element may be configured to provide a focal length range from a few centimeters down to nanometers.

The above and herein exemplary described optical system may in addition comprise at least one collimator, wherein said collimator can be arranged before the at least one tunable optical element along an/the optical axis of the optical system.

The above and herein exemplary described optical system may in particular be configured for capturing at least two images at the same time, wherein different photodiodes of a pixel can be associated to different images.

For example, the at least one sensor of the optical system may comprise two photodiodes per each pixel of the sensor, and may be configured such that for each pixel, one photodiode of a pixel is associated with a first image and the other photodiode is associated with a second image.

In other words, the optical system/the at least one sensor of the optical system can capture two images at the same time.

The above-described configuration of two photodiodes per sensor pixel is exemplary only. Other configurations, i.e. with more photodiodes per pixel, are possible too, such that the optical system/the at least one sensor of the optical system may capture more than two images at the same time.

For example, it is possible that a sensor pixel may comprise an even number or an odd number of photodiodes.

However, an even number of photodiodes per pixel, e.g. a number of $2^n$ with n being a natural number greater than zero, may be used as this may facilitate the computational processing of the captured images.

Furthermore, the optical system/the at least one sensor of the optical system can be configured such that the images can be read out into separately indexed image arrays.

It is noted that herein the propagation of wavefronts, i.e. electromagnetic wavefronts, or of photons is assumed to follow the laws of geometrical optics, i.e., for example, it is assumed that the direction of propagation is perpendicular to the wavefront.

For completeness, it is noted that a/the wavefront can be defined by the set of points of a wave having the same phase, i.e. the wavefront or wavefront shape can be described by a phase map, e.g. a two-dimensional phase map.

Once the phase or shape of a wavefront is determined or measured or reconstructed, said wavefront can be propagated according to the principles of the Rayleigh-Sommerfeld diffraction law.

Thereby the wavefronts and light intensities in optical planes/focus planes that were not captured in the set of focus positions set by the at least one tunable optical element can be simulated/computed, and the optical system can act as a light field camera and as a tomographic phase sensor.

Furthermore, it is assumed that the distribution function of the light intensity of a propagated wavefront can be represented by a probability density function (PDF) for the probability of photon arrival.

It is further assumed that the wave-front propagation conserves the flux, i.e. that the total area under the one-dimensional PDF curve remains constant.

The above and herein exemplary described optical system may further comprise or be in communication with a data processing system, e.g. a computer system, which can be configured for storing and processing the plurality of captured images for extracting information on the two-dimensional and/or three-dimensional distribution of wavefronts from the plurality of captured images.

An exemplary method for capturing and extracting information on the two-dimensional and/or three-dimensional distribution of wavefronts from a plurality of images may comprise one, some or all of the following steps:

capturing a plurality of images with an optical system having at least one sensor comprising a plurality of pixels, wherein at least some of the pixels comprise at least two photodiodes, at a plurality of focus positions/at a plurality of different focus positions set by at least one tunable optical element of the optical system;

applying a wavefront reconstruction algorithm or wavefront phase retrieval algorithm to the captured plurality of images to extract information on the two-dimensional and/or three-dimensional distribution of wavefronts;

and/or applying a depth retrieval algorithm to the captured plurality of images to obtain a depth map of a scene/object/subject captured in the plurality of images.

Therein, the step of capturing a plurality of images may comprise the at least one sensor capturing at least two images at the same time in a single acquisition step, and wherein different photodiodes of a pixel of the at least one sensor are associated to different images, e.g. for each pixel a first photodiode of a pixel may be associated to a first image and a second photodiode of a pixel may be associated to a second image.

The herein exemplary described optical system/the herein exemplary described at least one sensor of the optical system can be understood as acting as an/as being part of an indirect wavefront sensor, since the optical system/the at least one sensor can be configured to measure the two-dimensional distribution/two-dimensional distribution function of the light intensities in at least two images captured at different optical planes/different focus planes/different focus positions, wherein said different optical planes/different focus planes/different focus positions can be set by the at least one tunable optical element of the optical system.

Due to said exemplary at least two images captured at different optical planes/different focus planes/different focus positions having an optical path difference, e.g. an optical path difference along the/an optical axis of the optical system, e.g. along a/the z-axis with the at least one sensor of the optical system lying in a plane spanned by an x-axis and a y-axis of an orthogonal coordinate system, known wavefront reconstruction algorithms or known wavefront phase retrieval algorithms can be applied to extract information on the two-dimensional and/or three-dimensional distribution of wavefronts from the captured plurality of images, i.e. from the captured/measured two-dimensional distribution/two-dimensional distribution function of the light intensities of images from different optical planes of the optical system.

In particular, a/the captured/measured two-dimensional distribution/two-dimensional distribution function of the light intensities of images from different optical planes of the optical system allows to recover/reconstruct the two-dimensional shape and/or phase of a wavefront passing through/received by the optical system.

For example, having measured/captured the two-dimensional distribution/two-dimensional distribution function of the light intensities in two images at/from two different optical planes, i.e. having an optical path difference, e.g. an optical path difference along an/the optical axis, allows the recovery/reconstruction of the shape or phase of a wavefront in a plane, e.g. a/the midway plane, between said two different optical planes.

Furthermore, for example, having measured/captured the two-dimensional distribution/two-dimensional distribution function of the light intensities in more than two images and in more than two different optical planes of the optical system allows the provision/obtaining of a three-dimensional tomography of a/the wavefront(s), since the shape or phase of a wavefront can be recovered/reconstructed at a plurality of different optical planes.

Examples for such possible wavefront reconstruction or wavefront phase retrieval algorithms that use a/the measured/captured two-dimensional distribution/two-dimensional distribution function of the light intensities in more than two images and in more than two different optical planes of the optical system to recover/reconstruct the two-dimensional shape or phase of a wavefront in a plane and/or that provide/obtain a three-dimensional tomography of a/the wavefront(s) along a plurality of different optical planes can inter alia be found in Wooptix S. L. European patent application EP 3 358 321 A1 (cf. paragraphs [0078] to [0090]) and/or in "A practical algorithm for the determination of the phase from image and diffraction plane pictures." (Gerchberg, R. W.; Saxton, W. O., 1972, Optik 35: p. 237-246) and/or in "Phase retrieval algorithms: a comparison" (Fienup, J. R., 1982, Appl. Opt. 21 (15): p. 2758-2769), the content of which is included by reference.

Alternatively or in addition, a depth retrieval algorithm can be applied to the captured plurality of images to obtain a depth map of a scene and/or object and/or subject captured in the plurality of images.

In particular, said optional depth retrieval algorithm may comprise depth-from-focus and/or depth-from-defocus techniques as, for example, described in Wooptix S. L. European patent application No. 21382458.4 and/or in "Variational Depth From Focus Reconstruction" (Moeller M.; Benning M.; Schonlieb C.; Cremers D.; 2014, arXiv:14080173v2) and/or in "Depth from Focus with Your Mobile Phone" (Suwajanakorn S.; Hernandez C.; Seitz, S. M.; 2015 doi: 10.1109/CVPR.2015.7298972), the content of which is included by reference.

Any of the above-cited examples for recovering wavefront shapes and/or wavefront phases and/or depth retrieval from measured light intensities in captured images can, among others, be used for extracting information on the two-dimensional and/or three-dimensional distribution of wavefronts from the plurality of images captured by the herein described optical system.

As indicated above, when capturing a plurality of images with an/the optical system having at least one sensor comprising a plurality of pixels, wherein at least some of the pixels comprise at least two photodiodes, at a plurality of focus positions/at a plurality of different focus positions set by at least one tunable optical element of the optical system, each capturing step may comprise a step of a single acquisition of the at least one sensor of the optical system wherein at least two images are captured at the same time, and wherein different photodiodes of a pixel of the at least one sensor are associated to different images.

For example, the nth image $I_{(x,y)}^n$ captured in the (x,y)-plane of an/the exemplary at least one sensor of the optical system may be extracted/indexed according to the following equation:

$$I_{(x,y)}^n = C_{(Nx+n),y} \qquad (1)$$

Herein, $C \in \mathbb{R}^{h,w}; x \in \left[0, \frac{w}{N}\right]; y \in [0, h]; n \in [0, N]$.

and N is the number of photodiodes per pixel, i.e. N is a natural number that is greater than 1, w is the width dimension and h is the width dimension of an image/of the at least one sensor in pixels in the (x,y)-plane of the sensor, wherein said (x,y)-plane can coincide with the image plane and wherein x can denote rows and y can denote columns of the at least one sensor and wherein C denotes the data captured/acquired by the at least one sensor in a single acquisition step/capture step.

Furthermore, and exemplarily denoting the plurality of focus positions/the plurality of different focus positions that can be set by at least one tunable optical element of the optical system with NP, with NP being a natural number greater than 1 and with N being the natural number of photodiodes per pixel, i.e. N being also greater than 1, an exemplary optical system/an exemplary at least one sensor of the optical system may capture N×NP images.

Hence, with w denoting a/the width dimension and with h denoting a/the width dimension of an image/of the at least one sensor, e.g. measured in pixels, the data acquired/captured by an/the optical system having at least one sensor can be modeled from a computational point of view as a four-dimensional tensor/four-dimensional matrix of size NP×w×h×N.

As also previously indicated, the index N that denotes the number of photodiodes per pixel can also be considered as denoting the number of viewpoints or number of viewing angles per pixel.

It is to be noted for completeness that data acquired by the herein described optical system/at least one sensor can be fed directly or after some processing, e.g. after applying a wavefront reconstruction algorithm or a wavefront phase retrieval algorithm and/or after applying a depth retrieval algorithm, to any system that is capable of representing/ displaying volumetric, i.e. three-dimensional, optical data in real time, such as holographic displays or integral displays.

Using a herein exemplary described optical system/at least one sensor in combination with at least one tunable optical element can significantly increase the spatial resolution that can be used and displayed with the aforementioned exemplary display devices/display systems in real time.

An exemplary system for capturing and extracting information on the two-dimensional and/or three-dimensional distribution of wavefronts from a plurality of images may comprise one, some or all of the following components:

an optical system for capturing a plurality of images, wherein the optical system can comprise one, some or all of the features exemplary described above and herein;

a computing system comprising one or more processors and a computer memory, the computer memory storing instructions that direct the one or more processors to carry out a method for extracting information on the two-dimensional and/or three-dimensional distribution of wavefronts from the plurality of images captured by the optical system, wherein the method can comprises one, some or all of the above and herein exemplary described steps.

Said processors may be, for example, central processing units (CPUs) or graphics processing units (GPUs).

Since the herein exemplary described means, system and method are in particular directed to the processing of images/image pixels, the use of GPUs can be used to achieve faster/optimal computation performances.

However, also common current CPUs, even of mobile devices such as smartphones, are also powerful enough to carry out the herein described image data processing steps even for real-time applications, in particular when using the above-mentioned wavefront reconstruction algorithms or wavefront phase retrieval algorithms and/or depth retrieval algorithms that use two-dimensional light intensity distributions of a wavefront/of wavefronts captured in the plane of the at least one sensor as input.

Said exemplary system may be portable, e.g. may be a smartphone, wherein the optical system is the camera of the smartphone and which is configured for capturing a plurality of images at a plurality of different focus positions set by at least one tunable optical element of the camera.

Furthermore, computer-executable instructions that, when executed by a computer system, can perform a method for capturing and extracting information on the two-dimensional and/or three-dimensional distribution of wavefronts from a plurality of images as described herein, can be stored on a computer-readable storage medium, e.g. a non-volatile computer storage medium.

The herein exemplary described plurality of focus positions set by the at least one tunable optical element of the optical system may, for example, comprise at least three focus positions, e.g. three different focus positions. For the computational power of current mobile phones, for example, a number between 3 and 7, may be used for real-time applications.

BRIEF DESCRIPTION OF THE FIGURES

The following figures illustrate exemplary certain technical aspects for a better understanding of the disclosure.

DETAILED DESCRIPTION

Figure 1:
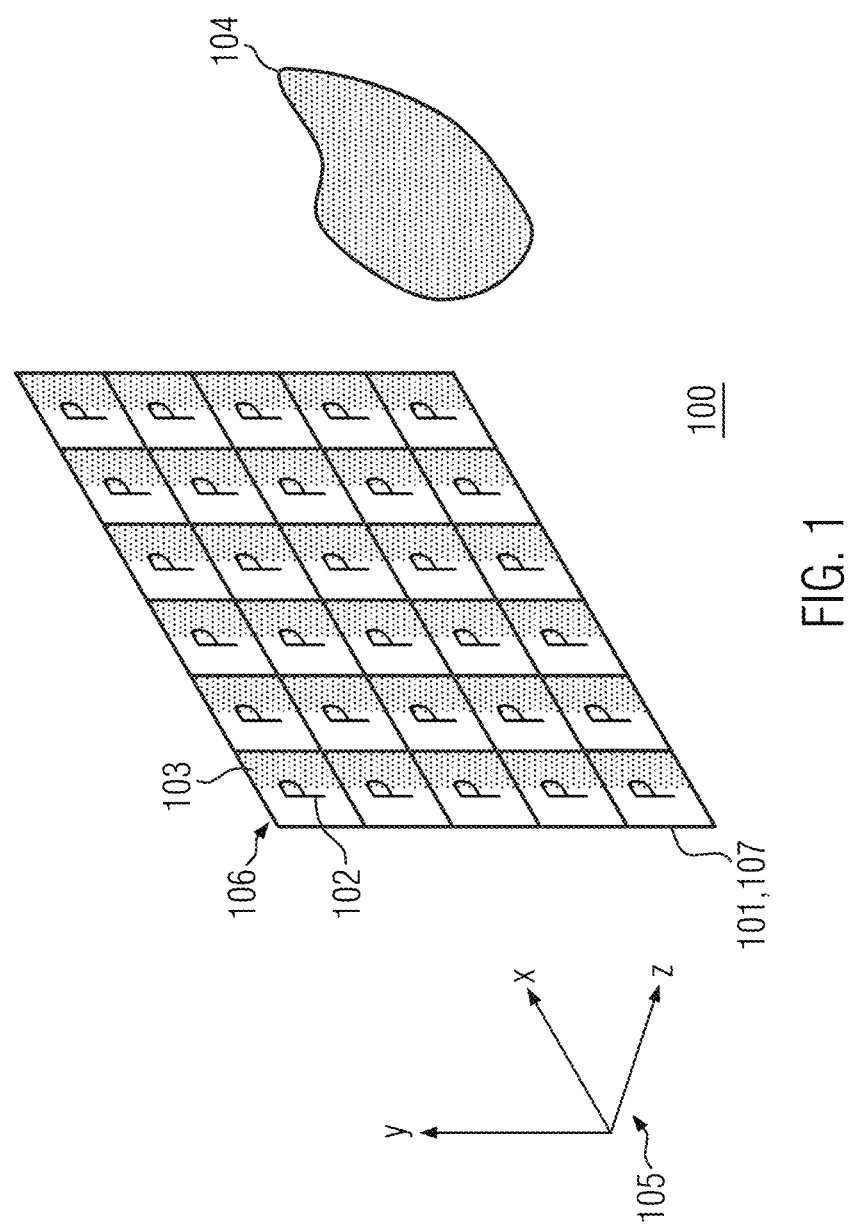
FIG. 1: Exemplary optical system

FIG. 1 exemplary shows a possible exemplary optical system 100 that can have some or all of the above-described features.

For example, a sensor 101, e.g. a charge-coupled device (CCD) sensor, with a plurality of pixels 106 is shown. In this example the sensor 101 comprises an exemplary pixel array 107 of 6×5 pixels in the x, y-plane of the exemplary orthogonal coordinate system 105 with axes x, y and z.

Some or each of the pixels 106 can have a plurality of photodiodes 102, 103.

In the shown example, each of the pixels 106 from the exemplary pixel array 107 comprises two photodiodes 102, 103, that exemplary divide each of the pixels along the vertical y-axis.

For clarity and readability only one pixel, i.e. the pixel 106 in the top left of the array, together with its photodiodes 102, 103, has been annotated and marked with reference numerals.

In the example shown, the sensor 101, i.e. the array 107 is exemplary oriented as lying in the x, y-plane. The exemplary z-axis of the orthogonal coordinate system 105 can thus inter alia be understood as an exemplary optical axis of the optical system 100.

The shown exemplary tunable optical element 104 is then exemplary arranged along the optical axis such that incoming light entering the optical system 100 can first pass the exemplary tunable optical element 104 before it hits the sensor 101.

As exemplary described above, the exemplary tunable optical element 104 can be configured such that it can vary the focus of the optical system and thereby can allow the optical system 100 to capture a plurality of images at a plurality of focus positions, e.g. along the optical axis, e.g. the z-axis, with the sensor 101.

For example, to set a plurality of focus positions, the exemplary tunable optical element 104 may have shape-shifting capabilities (as exemplary indicated by the wavy contour of the shown tunable optical element 104), e.g. may comprise a liquid lens, and/or may comprise a movable lens, e.g. a lens that can move along the optical axis in both directions, and/or may comprise a tunable prism.

Figure 2:
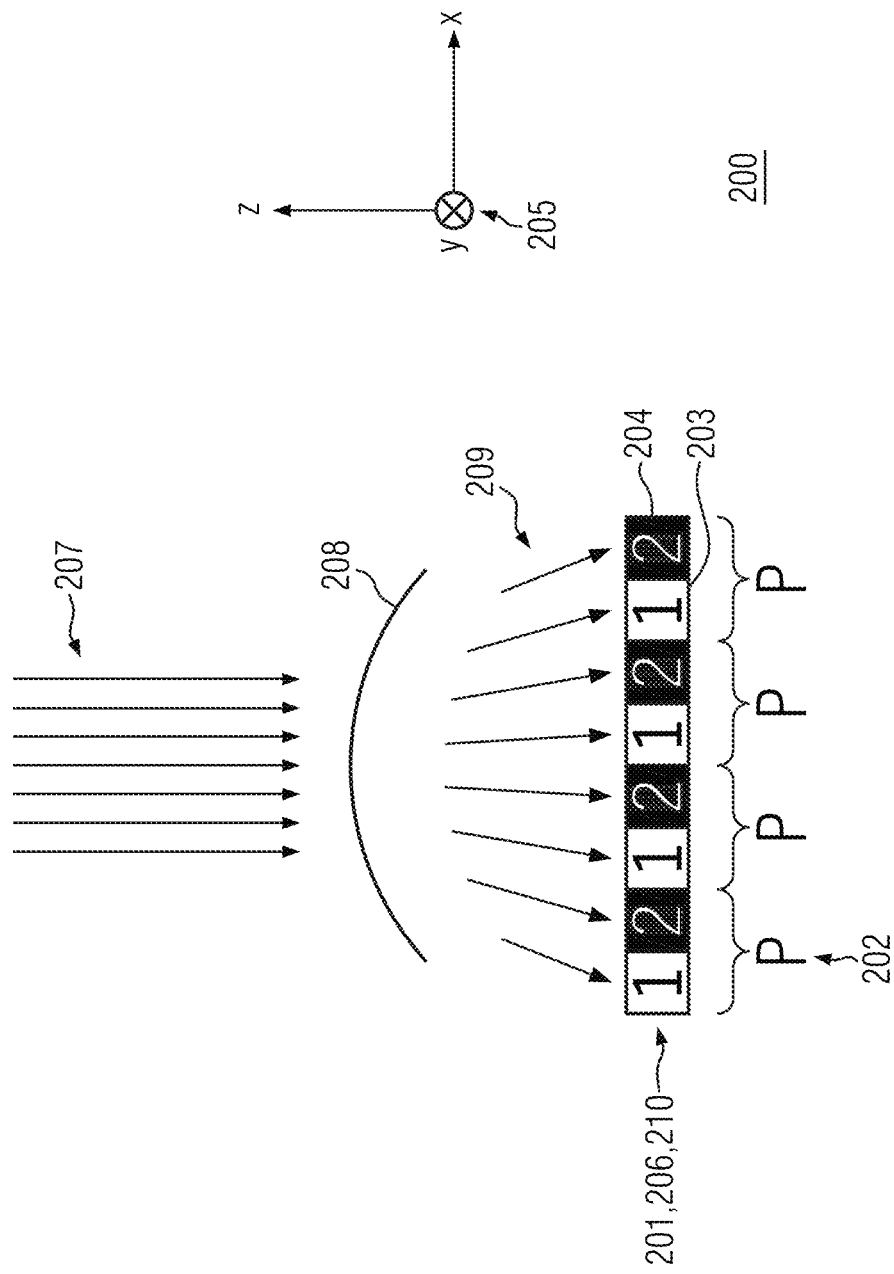
FIG. 2: Further exemplary optical system

FIG. 2 exemplary shows a further exemplary optical system 200 analog to the optical system 100 of FIG. 1.

Here the optical system 200 is shown from a different perspective, wherein only a single pixel row 210 of the sensor 201 or sensor array 206 along the x-axis of the exemplary three-dimensional orthogonal coordinate system 205 is visible.

Said exemplary three-dimensional orthogonal coordinate system 205 that serves as reference is exemplary aligned such that the y-axis is directed into/cutting through the drawing plane and the z-axis is aligned with an axis, e.g. a vertical axis, of the drawing plane and coincides with the optical axis of the optical system 200.

Exemplary pixel row 210 comprises four pixels, P, wherein again exemplary each pixel comprises two photodiodes 203, 204, e.g. a first photodiode, 1, and a second photodiode, 2.

The exemplary brackets } shown mark the association of photodiodes to their corresponding pixel.

The exemplary shown sensor array 206 may for example comprise 4×4 pixels. However, much larger pixel arrays can be used, e.g. arrays with megapixels or gigapixels sizes.

Incoming light 207, e.g. light entering the optical system 200 from an object or scene to be imaged, may be collimated by an optional collimator (not shown) before it passes through the exemplary tunable optical element 208.

As previously indicated, said exemplary tunable optical element 208 may comprise a liquid lens, and/or may comprise a movable lens, e.g. a lens that can move along the optical axis in both directions, for example being moved by actuators, and/or may comprise a tunable prism.

Hence, the exemplary tunable optical element 208 allows the varying of the focus of the optical system 200 such that a plurality of images at a plurality of focus positions, e.g. along the optical axis, e.g. the z-axis, set by the at least one tunable optical element 208 can be captured with the sensor 201.

After passing through the exemplary tunable optical element 208, the incoming light can hit the sensor 201 at a plurality of different angles, as exemplary indicated by the plurality of light beams 209 with different propagation directions.

Furthermore, due to the at least two photodiodes 203, 204, per each pixel, P, 202, at least two different viewpoints per pixel for light to be captured can be provided.

As exemplary described further below the different viewpoints per pixel provided by the different photodiodes per pixel can help to extract further information on the shape and/or phase of the incoming light wavefronts and/or of the depth of field, thereby inter alia allowing the improvement of the resolution of depth maps that can be obtained with a herein described optical system.

Figure 3:
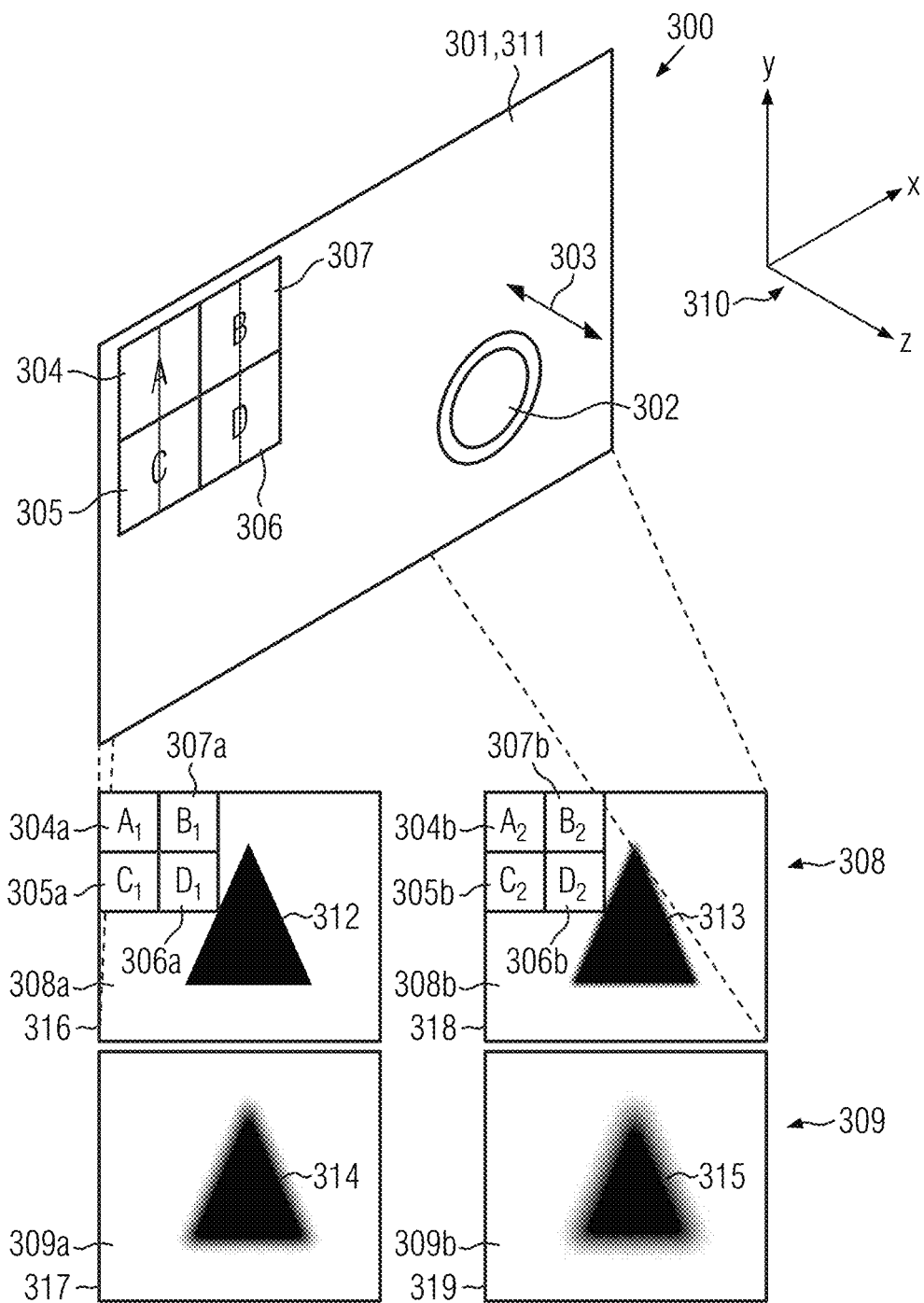
FIG. 3: Further exemplary optical system

FIG. 3 exemplary shows a further exemplary optical system 300 analog to the optical systems 100, 200 of FIG. 1 and FIG. 2, wherein in the exemplary shown perspective, the sensor 301 with sensor pixel array 311 is lying in the x,y-plane and the exemplary tunable optical element 302 is arranged along the z-axis of exemplary coordinate system 310, wherein said z-axis can coincide with the optical axis of the optical system 300.

Said exemplary tunable optical element 302, which can be of any of the previously described types, can for example be movable along said z-axis, as indicated by the arrow 303 to set a plurality of focus positions 308, 309.

From the sensor 301 only an exemplary subset of sensor pixels is shown, namely sensor array pixels 304, A, 305, C, 306, D, 307, B, wherein each pixel exemplary has two photodiodes, i.e. pixel 304, A, comprises photodiodes 304a, $A_1$, 304b, $A_2$, pixel 305,C, comprises photodiodes 305a, $C_1$, 305b, $C_2$, pixel 306,D, comprises photodiodes 306a, $D_1$, 306b, $D_2$, and pixel 307,B, comprises photodiodes 307a, $B_1$, 307b, $B_2$.

It is to be understood that the sensor array 311 can be fully covered with pixels with multiple photodiodes per pixel to form a sensor array 311 of any desired size for the height and width of the sensor array 311 and with any desired pixel resolution and with any desired plurality of photodiodes per pixel.

FIG. 3 further exemplary shows four images 316, 317, 318, 319 of an exemplary triangle shaped object captured by the sensor 301 of the optical system 300.

All images show the same triangle shaped object but in different focus/at different foci.

For example, the exemplary shown different focusses of the triangle shaped object 312, 313, 314, 315 are exemplary achieved by the tunable optical element 302 having set two different focus positions 308, 309, for example, due to the tunable optical element 302 having moved from a first position to a second position along the optical axis as indicated by arrow 303.

As previously mentioned, the tunable optical element 302 could also be of another type and for example could also set different focus positions by not moving along the optical axis but, for example, merely by changing its shape or form or orientation.

In addition to the two different focus positions 308, 309 set by the tunable optical element 302, the sensor 301 further allows the capturing of an image with different foci/focuses at the same time due to the different viewpoints per pixel provided by the plurality of photodiodes per pixel.

In the shown example with two different photodiodes per pixel this results in being able to capture two differently focused images of the triangle shaped object at the same time with the sensor 301 in a single capture/acquisition.

With the two different focus positions 308, 309 set by the tunable optical element 302 this exemplary results in four different images of 316, 317, 318, 319 with four different focuses/foci of the triangle shaped object.

In FIG. 3, the following exemplary four different focuses/foci of the triangle shaped object are illustrated:

Reference numeral 312 denotes in captured image 316 the image of the triangle shaped object being in focus 308a, which is the image seen by one set of photodiodes, e.g. comprising photodiodes 304a, $A_1$, 305a, $C_1$, 306a, $D_1$, 307a, $B_1$, at the focus position 308 set by the tunable optical element 302.

Reference numeral 313 denotes in captured image 318 the image of the triangle shaped object being in focus 308b, which is the image seen by another set of photodiodes, e.g. comprising photodiodes 304a, $A_2$, 305a, $C_2$, 306a, $D_2$, 307a, $B_2$, at the focus position 308 set by the tunable optical element 302.

Reference numeral 314 denotes in captured image 317 the image of the triangle shaped object being in focus 309a, which is the image seen by one set of photodiodes, e.g. comprising photodiodes 304a, $A_1$, 305a, $C_1$, 306a, $D_1$, 307a, $B_1$, at the focus position 309 set by the tunable optical element 302.

Reference numeral 315 denotes in captured image 319 the image of the triangle shaped object being in focus 309b, which is the image seen by another set of photodiodes, e.g. comprising photodiodes 304a, $A_2$, 305a, $C_2$, 306a, $D_2$, 307a, $B_2$, at the focus position 309 set by the tunable optical element 302.

The plurality of images with different foci/focuses captured by the sensor 301 of the exemplary optical system can then, for example, be fed into one or more of the previously mentioned algorithms for extracting information on the two-dimensional and/or three-dimensional distribution of wavefronts that are emitted from a scene or object or subject in the field of view of the optical system for reconstructing original two-dimensional wavefront shapes and wavefront phases, for performing wavefront tomography along the optical axis, and for obtaining depth maps.

In particular the measured/captured information on the two-dimensional light intensity distribution of a wavefront/of wavefronts captured by the sensor 301 can then form the basis for recovering wavefront shapes or wavefront phases and/or for performing wavefront tomography and/or form the basis for obtaining depth maps.

Figure 4:
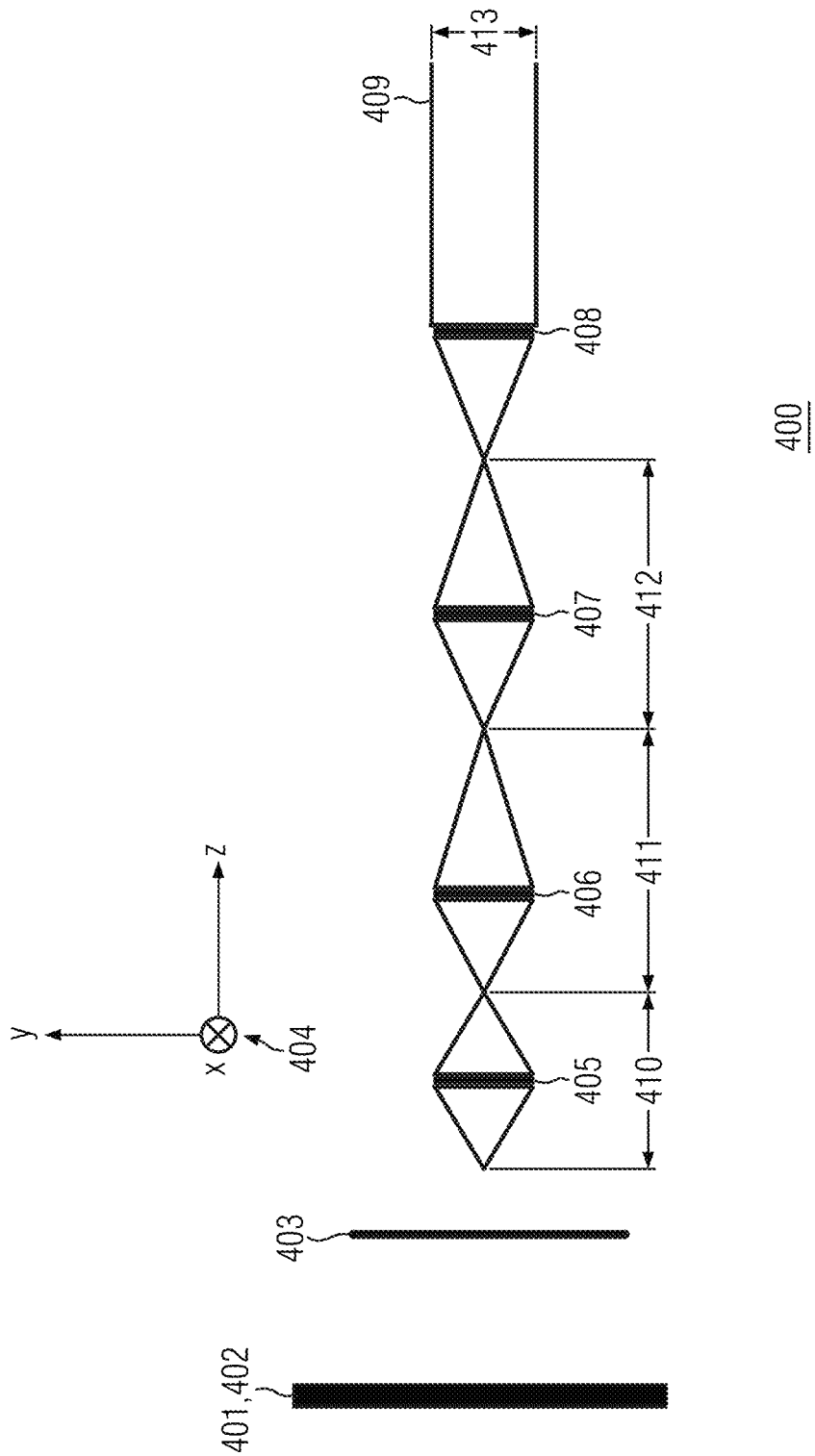
FIG. 4: Exemplary ambiguity/uncertainty of focus point

FIG. 4 exemplary shows the ambiguity or uncertainty or degeneracy of a focus position within the depth of field (DOF) for various focus positions of an exemplary optical system 400.

Simply speaking, when two objects to be imaged have a spatial distance between them along the optical axis that is less than the depth of field (DOF) of the optical system setup, both objects will appear to be in focus/in the same focus.

Hence, for current optical systems this inter alia limits the accuracy with which information of the spatial distance or depth can be derived from captured images.

Said exemplary optical system 400 may be analog to the previously described optical systems and exemplary comprises a sensor 401 or pixel array 402 arranged in the x,y-plane of an exemplary reference orthogonal coordinate system 404 with axes x,y,z wherein the z-axis lies in the drawing plane and exemplary coincides with the optical axis of the optical system 400.

The optical system 400 further comprises an exemplary tunable optical element 403 arranged along the optical axis of the optical system 400, i.e. along the z-axis.

Furthermore, three exemplary different focus positions/focal planes/focus planes 405, 406, 407 of the optical system 400 are shown that may have been set by the exemplary tunable optical element 403 and their corresponding depths of field (DOFs) 410, 411, 412 along the optical axis using the exemplary incoming light beam(s) 409 for illustration.

Furthermore, the exemplary hyperfocal distance position 408 is marked, beyond which all objects to be imaged by the optical system appear to be in focus.

Reference numeral 413 exemplary marks a possible aperture of the optical system.

For example, an exemplary optical system for implementing the above and herein described exemplary features may have an f-stop number of 2.0 or less. However also higher f-stop numbers are conceivable.

As illustrated, the width of the depths of field (DOFs) 410, 411, 412 can differ between different focus positions and the depths of field (DOFs) 410, 411, 412 can be symmetric or asymmetric with respect to the optical axis, i.e. the focus positions 405, 406, 407 do not necessarily define a center position/center plane of the depths of field (DOFs) 410, 411, 412.

Figure 5:
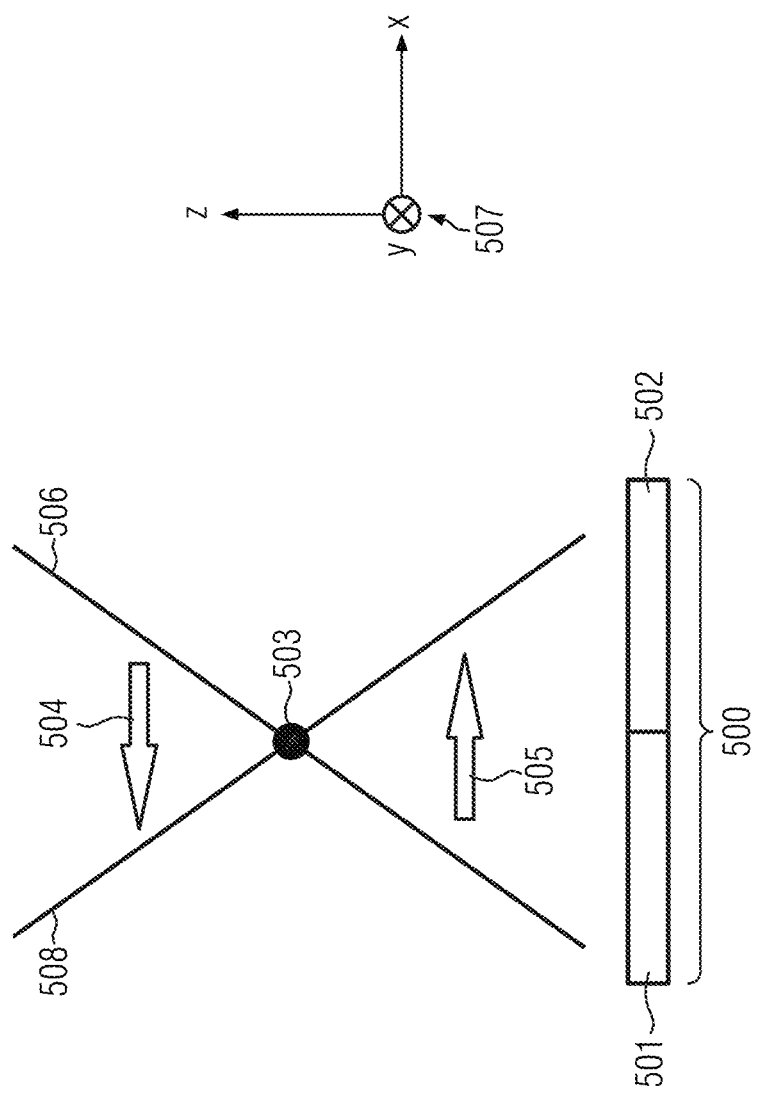
FIG. 5: Exemplary displacement of two photodiodes for providing different viewpoints for incoming light beams.

FIG. 5 exemplary illustrates how a herein described optical system can help to improve the spatial resolution of an optical system, i.e. the depth resolution, along the optical axis, e.g. the z-axis of exemplary reference orthogonal coordinate system 407 with axes x,y,z.

Exemplary shown is a single pixel 500 of a plurality of pixels of a sensor as previously described, wherein the exemplary pixel exemplary has two photodiodes; a first photodiode 501 and second photodiode 502. The pixel lies in the exemplary x,y-plane of orthogonal coordinate system 407.

The displacement of the two photodiodes along the exemplary x-axis provides different viewpoints for incoming light beams 506, 508.

The behavior or characteristics of the disparity or displacement of light beams in the x,y-plane hitting the photodiodes can then be used to derive/determine the true distance from the pixel 500, i.e. from the sensor, to the focus point/focus position 503 using trigonometry.

For example, at the focus position 503 the disparity is zero, while for distances along the z-axis, that are closer to the pixel 500 than the focus point 503, the disparity is positive and increases positively from the first photodiode 501 towards the second photodiode 502 along the x-axis, and for distances along the z-axis, that are further from the pixel 500 than the focus point 503, the disparity is negative and increases negatively from the second photodiode 502 towards the first photodiode 501 along the x-axis.

For example, for a given/measured positive disparity, the distance d to the focus point from a multiple photodiode of a herein described sensor can be extracted from the following equation:

$$d = \frac{-1}{\frac{pxs \times \sigma}{\rho \times D \times \det} + \frac{1}{\det} - \frac{1}{f}}. \tag{2}$$

Herein, pxs is the pixel size, $\sigma$ is the disparity value, $\rho$ is an exemplary constant to define the relation between the circle of confusion and the real defocus, D is the aperture, f the focal length and det denotes the following expression:

$$\det = \frac{1}{\frac{1}{f} - \frac{1}{\text{focus}}}. \tag{3}$$

Herein, focus is a/the focus position (e.g. set by a/the tunable optical element), and $\rho$ can be exemplary determined from:

$$\frac{pxs \times \sigma}{\rho \times D \times \det} = \left| \frac{-1}{d} + \frac{1}{f} - \frac{1}{\det} \right|. \tag{4}$$

For a given/measured negative disparity, only the sign of equation (2) is to be changed.

Combining the information captured from the multiple photodiodes per pixel of a/the sensor of a herein described optical system for a plurality of focus positions set by a/the one tunable optical element of a herein described optical system can therefore increase the depth information that can be obtained from captured images to obtain more precise depth maps.

Furthermore, the plurality of photodiodes per pixel can further allow improving the accuracy of wavefront phase measurements by using the multiple photodiodes' images to generate N tomographic layers of the wavefront distribution, where N is the number of photodiodes per pixel.

Figure 6:
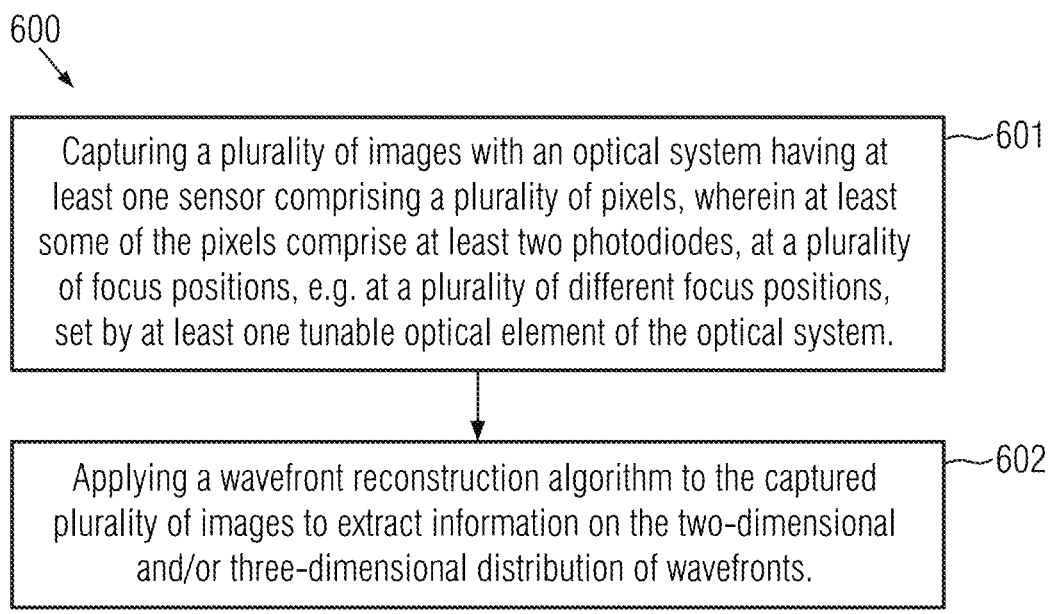
FIG. 6: Shows a flow diagram of a method for capturing and extracting information on the two-dimensional and/or three-dimensional distribution of wavefronts from a plurality of images.

FIG. 6 exemplary shows a flow diagram of a method, 600, for capturing and extracting information on the two-dimensional and/or three-dimensional distribution of wavefronts from a plurality of images.

As previously described, the method may comprise:

Capturing, 601, a plurality of images with an optical system having at least one sensor comprising a plurality of pixels, wherein at least some of the pixels comprise at least two photodiodes, at a plurality of focus positions, e.g. at a plurality of different focus positions, set by at least one tunable optical element of the optical system.

Applying, 602, a wavefront reconstruction algorithm to the captured plurality of images to extract information on the two-dimensional and/or three-dimensional distribution of wavefronts.

Followed by FIGS. 1, 2, 3, 4, 5 and 6, wherein the reference signs denote the following exemplary components and/or exemplary steps.

- 100 Exemplary optical system
- 101 Exemplary sensor
- 102 Exemplary photodiode
- 103 Exemplary photodiode
- 104 Exemplary optical tunable element
- 105 Exemplary orthogonal coordinate system
- 106 Exemplary pixel
- 107 Exemplary pixel array
- 200 Exemplary optical system
- 201 Exemplary sensor
- 202 Exemplary pixel
- 203 Exemplary photodiode
- 204 Exemplary photodiode
- 205 Exemplary orthogonal coordinate system
- 206 Exemplary sensor array/pixel array
- 207 Exemplary incoming light beams
- 208 Exemplary optical tunable element
- 209 Exemplary light beams
- 210 Exemplary pixel row
- 300 Exemplary optical system
- 301 Exemplary sensor
- 302 Exemplary optical tunable element
- 303 Exemplary movement of optical tunable element
- 304, 305, 306, 307 Exemplary pixel(s)
- 304a, 305a, 306a, 307a Exemplary photodiode
- 304b, 305b, 306b, 307b Exemplary photodiode
- 308, 309 Exemplary focus position
- 310 Exemplary orthogonal coordinate system
- 311 Exemplary sensor array/pixel array
- 312, 313, 314, 315 Exemplary triangle shaped object image at different foci
- 316, 317, 318, 319 Exemplary images captured by sensor
- 400 Exemplary optical system
- 401 Exemplary sensor
- 402 Exemplary sensor array/pixel array
- 403 Exemplary optical tunable element
- 404 Exemplary orthogonal coordinate system
- 405, 406, 407 Exemplary focus positions/focus points
- 408 Exemplary hyperfocal distance position
- 409 Exemplary light beam
- 410, 411, 412 Exemplary depth of field
- 413 Exemplary aperture
- 500 Exemplary pixel
- 501 Exemplary photodiode, e.g. first photodiode
- 502 Exemplary photodiode, e.g. second photodiode
- 503 Exemplary focus position/focus point
- 504 Exemplary direction of increasing negative disparity
- 505 Exemplary direction of increasing positive disparity
- 506 Exemplary light beam
- 507 Exemplary orthogonal coordinate system
- 508 Exemplary light beam
- 600 Exemplary method
- 601 Exemplary method step
- 602 Exemplary method step

The invention claimed is:

1. An optical system for capturing information on a two-dimensional and/or three-dimensional distribution of wavefronts from a plurality of images, the optical system comprising:

at least one sensor for capturing images, wherein the at least one sensor comprises a plurality of pixels, and wherein at least some of the pixels comprise at least two photodiodes;

at least one tunable optical element, wherein said at least one tunable optical element is adapted to vary a focus of the optical system; and at least one collimator, wherein said collimator is arranged before the at least one tunable optical element along an/the optical axis of the optical system;

wherein the optical system is configured for capturing a plurality of images with the at least one sensor at a plurality of focus positions set by the at least one tunable optical element.

2. The optical system according to claim 1, wherein the at least one tunable optical element comprises a liquid lens and/or a movable lens and/or a tunable prism.

3. The optical system according to claim 1, wherein the at least one tunable optical element is configured to change the focus of the optical system on time scales of less than 10 ms.

4. The optical system according to claim 1, comprising a further optical element, e.g. a lens, configured to change the focal length range of the optical system.

5. The optical system according to claim 1, wherein the at least one sensor is configured for capturing at least two images at the same time, and wherein different photodiodes of a pixel are associated to different images.

6. The optical system according to claim 1, wherein the optical system comprises or is in communication with a data processing system that is configured for storing and processing the plurality of captured images to extract information on the two-dimensional and/or three-dimensional distribution of wavefronts from the plurality of captured images.

7. A method for capturing and extracting information on the two-dimensional and/or three-dimensional distribution of wavefronts from a plurality of images, the method comprising:

capturing a plurality of images with an optical system having at least one sensor comprising a plurality of pixels, wherein at least some of the pixels comprise at least two photodiodes, at a plurality of focus positions set by at least one tunable optical element of the optical system, the optical system having at least one collimator, and wherein said collimator is arranged before the at least one tunable optical element along an/the optical axis of the optical system; and applying a wavefront reconstruction algorithm to the captured plurality of images to extract information on the two-dimensional and/or three-dimensional distribution of wavefronts.

8. The method according to claim 7, further comprising applying a depth retrieval algorithm to the captured plurality of images to obtain a depth map of a scene captured in the plurality of images.

9. The method according to claim 7, wherein in a single acquisition of the at least one sensor of the optical system at least two images are captured at the same time, and wherein different photodiodes of a pixel of the at least one sensor are associated to different images.

10. A system for capturing and extracting information on the two-dimensional and/or three-dimensional distribution of wavefronts from a plurality of images, the system comprising:

an optical system for capturing a plurality of images, the optical system having at least one collimator, wherein said collimator is arranged before at least one tunable optical element along an/the optical axis of the optical system; and a computing system comprising one or more processors and a computer memory, the computer memory storing instructions that direct the one or more processors to carry out a method for extracting information on the two-dimensional and/or three-dimensional distribution of wavefronts from the plurality of images captured by the optical system.

11. The system according to claim 10, wherein the system is a portable mobile device, e.g. a smartphone.

12. One or more non-transitory computer-readable media for storing computer-executable instructions that, when executed by a computer system, perform the method according to claim 7.

* * * * *